No. 693,650. Patented Feb. 18, 1902.
J. E. JOHNSON.
AUTOMATIC SIGNAL APPARATUS FOR LIQUID HOLDING TANKS.
(Application filed July 31, 1901.)
(No Model.) 2 Sheets—Sheet 1.

WITNESSES:
C. Sedgwick
J. W. Howard

INVENTOR
John E. Johnson
BY
A. D. Thayer
ATTORNEY

No. 693,650. Patented Feb. 18, 1902.
J. E. JOHNSON.
AUTOMATIC SIGNAL APPARATUS FOR LIQUID HOLDING TANKS.
(Application filed July 31, 1901.)

(No Model.) 2 Sheets—Sheet 2.

WITNESSES:
C. Sedgwick
J. M. Howard

INVENTOR
John E. Johnson
BY
A. O. Thayer
ATTORNEY

THE NORRIS PETERS CO., PHOTO-LITHO., WASHINGTON, D. C.

UNITED STATES PATENT OFFICE.

JOHN E. JOHNSON, OF BROOKLYN, NEW YORK.

AUTOMATIC SIGNAL APPARATUS FOR LIQUID-HOLDING TANKS.

SPECIFICATION forming part of Letters Patent No. 693,650, dated February 18, 1902.

Application filed July 31, 1901. Serial No. 70,412. (No model.)

*To all whom it may concern:*

Be it known that I, JOHN E. JOHNSON, a citizen of the United States of America, and a resident of Brooklyn, county of Kings, and State of New York, have invented certain new and useful Improvements in Automatic Signal Apparatus for Liquid-Holding Tanks, of which the following is a specification.

My invention consists of improved apparatus for use in connection with liquid-holding tanks which are to be frequently filled and emptied for automatically signaling when full and when empty, as hereinafter described, reference being made to the accompanying drawings, in which—

Figure 1:
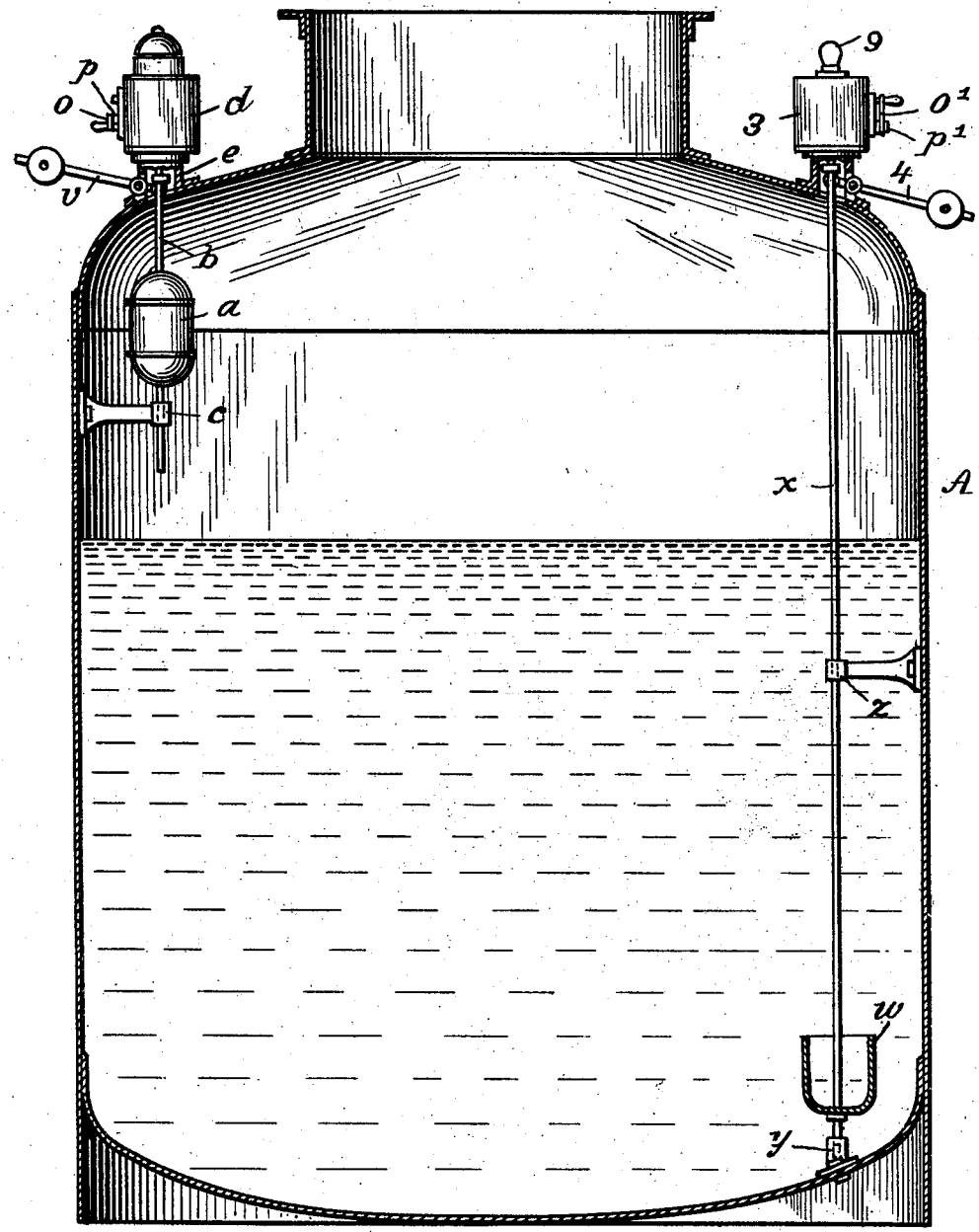
Figure 2:
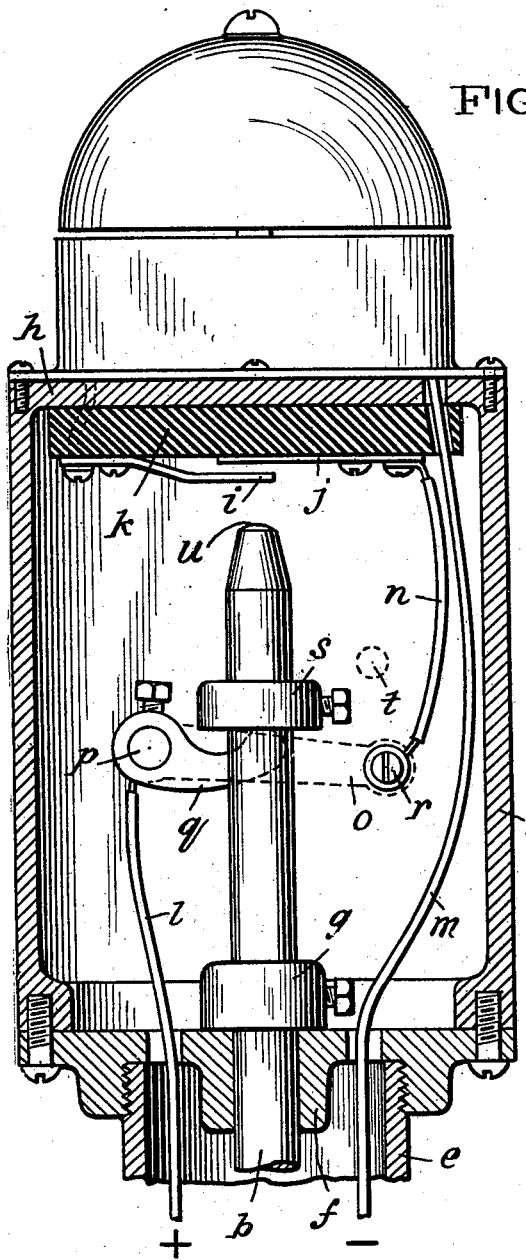
Figure 3:
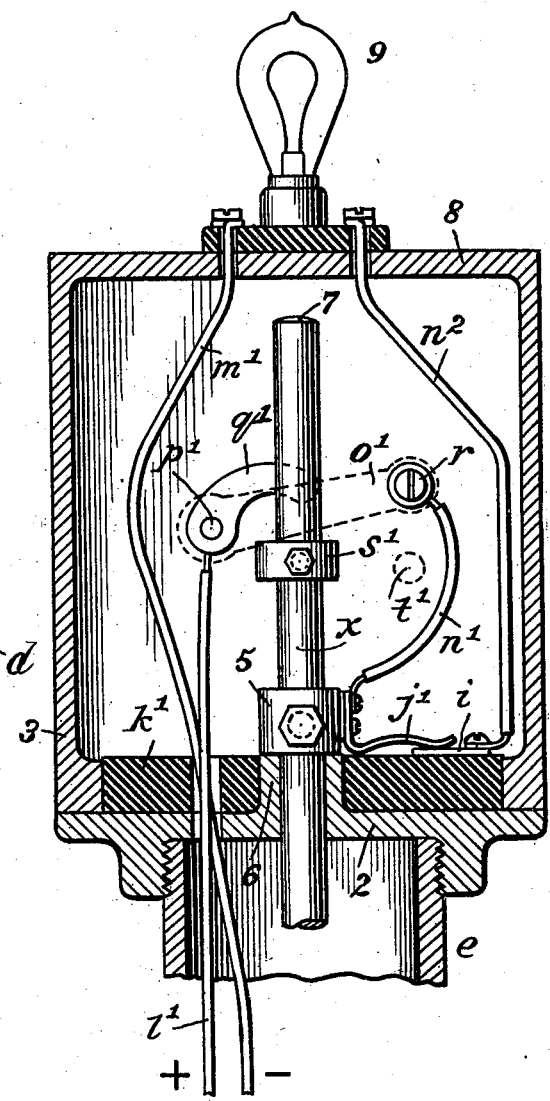

Figure 1 is a vertical section of a tank partly filled with liquid, showing the signaling apparatus in a general view with some details in section. Fig. 2 is a vertical section of the apparatus for indicating the full condition of the tank. Fig. 3 is a vertical section of the apparatus for indicating when the contents of the tank have run out. Figs. 2 and 3 are drawn to a larger scale than Fig. 1.

A represents a large sheet-metal or boiler-plate tank, such as employed in many industries for holding liquids and which is required to be filled and emptied frequently, as for measuring large quantities, and demanding attention for shutting off the supply or turning it on and for other purposes when the respective operations terminate. Let it be supposed that such a tank is, as represented in Fig. 1, in the process of filling with liquid. The liquid will at a certain height reach a float $a$, to which is attached the stem $b$, guided below the float in a bracket $c$, and above said float extending up through the top of the tank into a small case $d$, supported by any suitable standard $e$ and having the centrally-perforated bottom plate $f$, in which stem $b$ is guided above the float. A collar $g$, suitably adjusted and fixed to the stem $a$ above bottom $f$, limits the fall of the float. The stem $b$ reaches from said collar when resting on said bottom of the case nearly to the cover $h$ of the case. On the under side of this cover two electric contact-pieces $i$ and $j$ are mounted, with a suitable intermediate insulating-piece $k$ in an electric bell or other electric signal-circuit, whereof $l$ is the battery-wire and $m$ the return-wire. The connection of the contacts with the battery-wire $l$ is through the wire $n$, contact $r$, and switch $o$.

The switch-arm $o$ is carried outside of case $d$ on an axis $p$, extending into case $d$ through its side and having on its inner end a lever-arm $q$, the free end of which ranges in suitable proximity to the stem $d$ of the float, whereby a collar $s$, suitably adjusted on said stem above said arm, will when the float falls take effect so as to swing said switch-arm from above, say, the open position $t$ into contact with $r$, thus closing the circuit through said switch preparatory for future action, but leaving said circuit open through contacts $ij$. The float is partly counterbalanced by the weighted lever $v$ for sensitiveness of action. Now it will be seen that when the liquid rises in the tank and lifts the float the upper end $u$ of the stem will close contacts $ij$, completing the circuit and giving the bell-signal notifying the attendant of the fullness of the tank. Then the attendant having been duly notified will open the switch preparatory to the next operation, and having given proper attention by shutting off the supply of liquid and opening the discharge will await the signal "empty," for which the following apparatus is provided in accordance with my invention.

A cup $w$ is suspended within the tank just above its bottom by a rod $x$ in suitable guides $y z$ and in the centrally-perforated bottom 2 of a case 3 similar to case $d$ and similarly mounted on the top of the tank, said cup being also counterbalanced by a weighted lever, as 4, this being adjusted so as to lift the cup when submerged, and the contents of the cup are balanced by the surrounding liquid. The fall of the cup when the tank is empty is limited by a collar 5, attached to stem $x$ within case 3, coming to rest on the central hub 6 of the bottom of case 2, and the rise of the cup is limited by the upper end 7 of the stem lodging against the under side of the cover 8 of said case. The signal in this case is preferably a lamp 9 to distinguish it from the signal for "full," and the electric circuit is practically the same as for the other signal; but the arrangement of apparatus is for closing the circuit and operating the signal when the cup falls. The wiring is the same. Thus $l'$, $n'$, and $n^2$ constitute the main battery-wire; $m'$, the return-wire. $o'$ is the switch. $p'$ is the axis of the switch; $q'$, the lever-arm on said axis; $s'$, the collar on the stem of the float, and $i'$ and $j'$ are the contacts for completing the circuit when the signal is to be given; but contact $i'$ is located on the bottom of case 3 and contact $j'$ is carried on the collar 5, which limits the fall of the cup so as to close the circuit when the fall occurs, and switch $o'$, axis $p'$, lever $q'$, and contact $r'$ are so located relatively to collar 5 that the switch is closed when the cup rises preparatory for the completion of the circuit when the cup falls. $t'$ indicates the open position to which the switch is set by the attendant after the signal has been given.

It is to be noted that in this improved signal apparatus the circuit is automatically closed preparatory to its operation and its closing is thus always insured, whereas it is liable to be sometimes neglected when the closing is dependent on the watchfulness of an attendant, and in this case it is the opening that is dependent on the attendant who may be relied on for this operation, as the continuing signals will attract his attention.

What I claim as my invention is—

The combination with a float-actuated electric-signal circuit-closer, of a circuit-breaking switch to interrupt the signals in advance of the recession of the float, and means to be automatically actuated by the reverse motion of the float to reset the switch preparatory for the successive operation.

Signed at New York city this 12th day of July, 1901.

JOHN E. JOHNSON.

Witnesses:
C. SEDGWICK,
A. P. THAYER.